United States Patent [19]

Pham et al.

[11] Patent Number: 4,892,906
[45] Date of Patent: Jan. 9, 1990

[54] URETHANE COATING COMPOSITION

[75] Inventors: Phung N. Pham, Shorewood; William E. Michael, Muskego, both of Wis.

[73] Assignee: PPG Industries, Inc., Pittsburgh, Pa.

[21] Appl. No.: 250,275

[22] Filed: Sep. 28, 1988

[51] Int. Cl.$^4$ .............................................. C08L 75/04
[52] U.S. Cl. ..................................... 524/730; 525/125
[58] Field of Search ......................... 524/730; 525/124

[56] References Cited

U.S. PATENT DOCUMENTS

| | | | |
|---|---|---|---|
| 3,622,651 | 11/1971 | Vasta et al. | 260/856 |
| 4,394,486 | 7/1983 | Chattha et al. | 525/162 |
| 4,396,753 | 8/1983 | Holubka | 528/45 |
| 4,409,380 | 10/1983 | Holubka | 528/45 |
| 4,410,678 | 10/1983 | Holubka et al. | 528/45 |
| 4,410,679 | 10/1983 | Holubka et al. | 528/45 |
| 4,554,188 | 11/1985 | Holubka et al. | 427/393.5 |
| 5,540,771 | 9/1985 | Ambrose et al. | 528/272 |

FOREIGN PATENT DOCUMENTS 1303421  1/1973  United Kingdom .

OTHER PUBLICATIONS

Military specification No. MIL-C-4616D (ME) dated May 21, 1987.
Product literature for RESIMENE 714, 717 and 730 from Monsanto Corporation.

*Primary Examiner*—Maurice J. Welsh
*Attorney, Agent, or Firm*—Linda Pingitore; Bruce H. Cottrell

[57] ABSTRACT

A coating composition is disclosed including an acrylic polyol, polyester polyol, a blend of curing agents, e.g., a blocked isocyanate and an aminoplast resin, and a liquid carrier. Optionally, pigmentation can be added, e.g., pigmentation adapted to provide camouflage under military specification MIL-C-46168D.

14 Claims, No Drawings

URETHANE COATING COMPOSITION

FIELD OF THE INVENTION

The present invention relates to high solids thermosetting coating compositions including a combination of polyester and acrylic polyols and a combination of hydroxyl crosslinking agents. In one aspect of the invention, the coating composition includes pigmentation sufficient to provide for controlled infrared reflectance.

BACKGROUND OF THE INVENTION

Military hardware coatings must be able to endure a wide variety of harsh environments including, for example, exposure to chemical agents such as mustard gas. At the same time, military coatings often require careful control of visible color, gloss and infrared reflectance in an effort to prevent detection by an enemy. One example of such a military coating is described by military specification MIL-C-46168D (ME) for an aliphatic polyurethane chemical agent resistant coating. However, the coating of said military specification is air-dried and therefore unsuitable for use in high speed production lines that require baked coatings. In addition, the military has also sought coatings that cure with reduced volatile emissions.

SUMMARY OF THE INVENTION

Bakable coatings have been developed having a lower volatile organic content (VOC) than the above-described military specification. Such coatings can be used in coating, e.g., containers, on high speed production lines. A coating composition is provided which comprises an acrylic polyol, a polyester polyol, a blend of curing agents and a liquid carrier. In one embodiment of the invention, the coating composition includes: (a) an acrylic polyol characterized as a stepwise reaction product of (i) a hydroxy-containing acrylic copolymer, (ii) a dicarboxylic acid anhydride, and (iii) a monoepoxide functional monomer; (b) a polyester polyol characterized as a reaction product of neopentyl glycol and hexahydrophthalic anhydride; (c) a blend of curing agents including a blocked diisocyanate and a melamine resin; (d) pigments adapted for providing low gloss and camouflaged spectral, e.g., IR, reflectance; and (e) a liquid carrier. In another embodiment of the invention, the coating composition includes: (a) an acrylic polyol characterized as a stepwise reaction product of: (i) a hydroxy-containing acrylic copolymer prepared from (a) about 5 to about 35 percent by weight of a hydroxyalkyl acrylate or methacrylate having from about 2 to about 6 carbon atoms in the alkyl group, (b) from about 1 to about 10 percent by weight of acrylic acid or methacrylic acid, and (c) from about 65 to about 95 percent by weight of a vinyl aromatic compound; (ii) tetrahydrophthalic anhydride; and (iii) a glycidyl ester of tertiary mono-carboxylic acid blend having carbon chain lengths of from 9 to 11 carbon atoms; (b) a polyester polyol characterized as a reaction product of neopentyl glycol and hexahydrophthalic anhydride; (c) a melamine resin characterized as a partially alkylated melamine-formaldehyde resin modified by methanol; (d) a blocked diisocyanate characterized as a methyl ethyl ketoxime blocked isocyanurate of hexamethylene diisocyanate; (e) pigments adapted for providing low gloss and camouflaged spectral, e.g., IR, reflectance; and (f) a liquid carrier.

DETAILED DESCRIPTION

The present invention is directed to coating compositions including a combination of polyols and a blend or combination of curing agents. The combination of polyols is typically an acrylic polyol in combination with a polyester polyol.

The acrylic polyol is a hydroxy-containing acrylic copolymer, e.g., an interpolymer of monoethylenically unsaturated hydroxy-containing monomers such as hydroxyalkyl acrylate or hydroxyalkyl methacrylate, preferably such hydroxy-containing alkyl acrylates or methacrylates having from about 2 to about 6 carbon atoms in an alkyl group, and other ethylenically unsaturated copolymerizable monomers such as alkyl acrylates and alkyl methacrylates. Examples of suitable hydroxyalkyl acrylates or hydroxyalkyl methacrylates are 2-hydroxyethyl acrylate, 2-hydroxy-1-methylethyl acrylate, 2-hydroxypropyl acrylate, 3-hydroxypropyl acrylate, 2-hydroxybutyl acrylate, 4-hydroxybutyl acrylate, 2-hydroxyethyl methacrylate, 2-hydroxy-1-methylethyl methacrylate, 2-hydroxypropyl methacrylate, 3-hydroxypropyl acrylate, 2-hydroxybutyl methacrylate, 4-hydroxybutyl methacrylate and the like, and acrylic acid or methacrylic acid esters of ethylene glycol and propylene glycol such as diethylene glycol acrylate and the like. Also useful are hydroxy-containing esters and/or amides of unsaturated acids such as maleic acid, fumaric acid, itaconic acid and the like. Typically, the acrylic polyol includes from about 5 to about 35 percent by weight of the monoethylenically unsaturated hydroxy-containing monomers based on total monomer weight, preferably from about 10 to about 25 percent by weight. Examples of suitable alkyl acrylates and methacrylates are methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate, methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, cyclohexyl methacrylate, isodecyl methacrylate, phenyl methacrylate, isobornyl methacrylate and the like.

In addition to the alkyl acrylates and methacrylates, other ethylenically unsaturated copolymerizable monomers can be copolymerized with the hydroxyalkyl acrylates and methacrylates including such ethylenically unsaturated materials as mono-olefinic and di-olefinic hydrocarbons, halogenated mono-olefinic and di-olefinic hydrocarbons, nitriles and the like. Examples of suitable monomers include styrene, alpha-methylstyrene, alpha-methyl chlorostyrene, 1,3-butadiene, acrylamide, acrylonitrile, methacrylonitrile, vinyl butyrate, vinyl acetate, allyl chloride, divinyl benzene, diallyl itaconate and mixtures thereof. Usually, these other ethylenically unsaturated materials are used in a mixture with one or more of the above-mentioned alkyl acrylates and methacrylates. The acrylic copolymer can also contain minor amounts, Preferably from about 1 to about 10 percent by weight of an alpha, beta-ethylenically unsaturated carboxylic acid such as acrylic acid or methacrylic acid.

Preferably, the acrylic polyol is a modified hydroxy acrylic copolymer. That is, after reaction of the various monomers to form the acrylic polyol, the acrylic polyol can be modified by successive reactions which lengthen the pendent hydroxyl group. For example, the acrylic copolymer can be further reacted with a dicarboxylic acid anhydride under conditions which will generate pendent ester-carboxyl groups. The dicarboxylic acid anhydride, such as hexahydrophthalic anhydride and tetrahydrophthalic anhydride, can be reacted with a portion of the hydroxyl functionality on the acrylic polyol, generally from about 30 to about 100 percent, preferably from about 40 to about 80 percent of the hydroxyl functionality. Tetrahydrophthalic anhydride is preferred as the anhydride. Optionally, the carboxylic group on the anhydride modified acrylic polyol can be subsequently reacted with a monoepoxide functional monomer, e.g., an epoxy ester. The epoxy ester can be, e.g., a glycidyl ester mixture such as Cardura E which is a glycidyl ester of a tertiary mono-carboxylic acid blend having carbon chain lengths of from 9 to 11 carbon atoms. The epoxy ester can be reacted with the anhydride modified acrylic polyol in amounts sufficient to react with portions of the carboxylic acid groups, generally such amounts being from about 1 to about 25 percent by weight of the total weight of acrylic polyol, preferably from about 5 to about 15 percent by weight.

The acrylic polyol used in the present coating composition can be prepared by conventional free radical initiated polymerization processes in which the monomers are blended with solvent, polymerization catalyst and, optionally, a chain transfer agent, and heated to about 75° C. to 150° C. for from about 1 to 6 hours to form the polymer. The molecular weight of the acrylic polymer can vary widely depending upon the percent solids desired in the final coating composition. Generally, the acrylic polymer has a number average molecular weight of from about 500 to 20,000, more preferably from about 1000 to 10,000. The number average molecular weight is determined by conventional gel permeation chromatography (GPC) using a polystyrene standard. Polymerization is preferably carried out in solution using a solvent in which the monomers are soluble such as toluene, xylene, or methyl isobutyl ketone and the like.

About 0.1 to about 5 percent by weight, based on the weight of the monomers, of a polymerization catalyst or initiator is used to prepare the acrylic polyol. Typical catalysts include azo catalysts, e.g., 2,2'-azobis(2-methylbutyronitrile) and azobis(2-methyl valeronitrile), or peroxide catalysts, e.g., benzoyl peroxide, substituted benzoyl peroxide or di-tert-butyl peroxide.

A chain transfer agent can be used to control the molecular weight of the acrylic polyol. Typical chain transfer agents include 2-mercapto ethanol, tertiary dodecyl mercaptan, mercapto propionic acid and the like. Such chain transfer agents as typically used in amounts of about 0.1 to about 10 percent by weight based on weight of monomers.

The polyester polyol of the coating composition can generally be formed by the esterification of a polyol with a polycarboxylic acid or an acid anhydride. The polyols conventionally employed in making the polyester polyol include alkylene glycols, such as ethylene glycol, propylene glycol, butylene glycol and neopentyl glycol, and other glycols such as hydrogenated bisphenol A, cyclohexane dimethanol, caprolactonediol reaction products, hydroxy alkylated bisphenols, polyether glycols, e.g., poly(oxytetramethylene) glycol and similar type compounds. Other diols of various types and polyols of higher functionality can also be used. Such higher polyols include trimethylolpropane, trimethylolethane, pentaerythritol and higher molecular weight polyols such as obtained by reaction of ethylene oxide and trimethylolpropane and various hydrolyzed epoxy resins. The preferred polyols are the alkylene glycols with neopentyl glycol being most preferred.

Suitable carboxylic acids used in the reaction with the above-described polyols include phthalic acid, isophthalic acid, terephthalic acid, tetrahydrophthalic acid, hexahydrophthalic acid, adipic acid, azelaic acid, sebacic acid, glutaric acid, chlorendic acid, tetrachlorophthalic acid, maleic acid, fumaric acid, itaconic acid, malonic acid, suberic acid, trimellitic acid, and anhydrides of these acids where they exist. The preferred carboxylic acids include hexahydrophthalic acid and hexahydrophthalic anhydride.

The esterification reaction is normally carried out at temperatures between about 120° C. and 280° C., preferably about 175° C. and 250° C. for a period of time ranging between about 3 hours and about 10 hours, preferably under an inert gas atmosphere such as under nitrogen. Conventional catalysts for the promotion of esterification reactions, such as, e.g., dibutyltin oxide, dibutyltin dilaurate, triphenyl phosphite, butyl stannoic acid and the like, can be used in catalytic amounts (e.g.: about 0.01 to about 1.0 percent by weight) to aid in the reaction. Minor amounts of a solvent, e.g., an aromatic solvent, such as toluene, xylene and the like, may preferably be used in preparation of the polyester polyol.

The combination of curing agents present in the coating composition are generally a mixture of an aminoplast resin and a polyisocyanate, i.e., a blocked polyisocyanate. The aminoplast curing agent can be, for example: alkylated melamines (melamine formaldehyde resins modified in whole or part by alcohols), e.g., partially methylolated melamines, partially butylated melamines, mixed methylolated/butylated melamines, and partially methylolated and highly methylolated melamines; polyalkyl ethers of polymethylol melamines, e.g., hexamethoxymethyl melamine; alkylated ureas (urea formaldehyde resins modified in whole or part by an alcohol), e.g., methylolated ureas and butylated ureas; alkylated benzoguanamine-formaldehyde resins, e.g., methylolated, ethylated or mixtures thereof benzoguanamine resins; trimers or polymers of formaldehyde, for example, trioxane or paraformaldehyde; polymethylol compounds of hexamethylene diurea; adipic acid dimethylol amide and methylol ethers thereof; tetramethylol hydrazodicarbonamide; polymethylol compounds of polycaprolactame and methylol ethers thereof; and compatible mixtures thereof. Partially alkylated melamines such as melamine formaldehyde resin modified by methanol are preferred as the aminoplast curing agent.

Examples of suitable blocked polyisocyanates include monomeric polyisocyanates such as toluene diisocyanate and 4,4'-methylenebis(cyclohexylisocyanate), isophorone diisocyanate and NCO-prepolymers such as reaction products of monomeric polyisocyanate such as those mentioned above with polyester of polyether polyols. The polyisocyanate can be blocked with suitable blocking agents which are those materials that unblock at elevated temperatures such as low aliphatic alcohols and oximes such as methyl ethyl ketone oxime or lactams such as caprolactame. Blocked polyisocyanates can be used to form stable one-packaged systems. A particularly preferred blocked polyisocyanate is the methyl ethyl ketoxime blocked isocyanurate of hexamethylene diisocyanate.

In preparing coating compositions for military topcoats having specific gloss, color and infrared reflectance requirements, pigmentation is preferably adapted to provide a spectral, e.g., IR, reflectance similar to the spectral reflectance profile of, e.g., green vegetation, black or tan. Preferably, the pigmentation is adapted to provide an IR reflectance within the spectral reflectance limits set out in Table I, Table IV and FIG. 12 of military specification MIL-C-46168D hereby incorporated by reference. FIG. 12 of said military specification illustrates the upper and lower ranges of spectral reflectance for green vegetation.

Infrared reflectivity can be measured utilizing a Diano match scan spectrophotometer. The energy transmitted is integrated over the range from 300 to 900 nanometers.

Examples of suitable reflective pigments include, e.g., chromium oxide, camouflage green, mapico tan, carbozole dioxazine violet, titanium dioxide and carbon black. Descriptions of suitable pigments can be found in the above referenced military specification. Selection of pigments for camouflage is well known by those skilled in the art. Besides a requirement of having a specified spectroreflectance, coating compositions in military applications are generally desired to have low gloss. To obtain a low gloss coating composition, as well as maintain a low VOC, low oil adsorption materials, such as silica (silicon dioxide), talc or a silane-treated silica, can be added. One example of a silane-treated silica is silicon dioxide treated with hexamethyldisilazane. Other silane-treated silicas may include silicas treated with silanes sold for treatment of inorganic pigments by companies such as Union Carbide. The coating composition may further include clays, anti-settling additives, catalysts, wetting agents and the like. The liquid carrier of the coating composition can generally be selected from among solvents such as ketones, e.g., methyl isobutyl ketone, methyl ethyl ketone, methyl amyl ketone and the like, aromatic hydrocarbons, e.g., xylene, toluene and naphtha-derived solvents, acetates, e.g., ethyl acetate, isopropyl acetate, normal propyl acetate, glycol ether acetate and the like.

The following examples are illustrative of the invention and are not meant to limit it to their details.

EXAMPLE A

An acrylic polyol was prepared from the following ingredients:

| Ingredients | Parts by Weight |
| --- | --- |
| Styrene | 1290.9 |
| Methacrylic acid | 94.4 |
| Hydroxyethyl methacrylate | 468.0 |
| Tertiary dodecyl mercaptan | 117.0 |
| Initiator[1] | 135.8 |
| Methyl isobutyl ketone | 248.0 |
| SOLVESSO 100[2] | 1130.1 |

[1] 2,2'-azobis (2-methylbutyronitrile), available as VAZO 67 from E. I. duPont de Nemours and Company.
[2] An aromatic solvent available from Union Carbide Company.

After preparation of the acrylic polyol by conventional polymerization techniques, the reaction mixture was cooled to about 120° C. and 188 parts by weight of tetrahydrophthalic anhydride was added. After maintaining the admixture for sufficient time for complete reaction, 305 parts by weight of Cardura E ®, a glycidyl ester of VERSATIC 911 acid, available from Shell Chemical Company was added and maintained at about 120° C. until reaction was complete. The resultant acrylic polyol had an acid value of about 18.6, or hydroxyl value of about 35.9, a percent solids of 63.1 when measured at 110° C. for one hour, and a viscosity of Y+.

EXAMPLE B

A polyester polyol was prepared from the following ingredients:

| Ingredients | Parts by Weight |
| --- | --- |
| Hexahydrophthalic anhydride | 255.0 |
| Neopentyl glycol | 345.0 |
| Butyl stannoic acid | 0.05 |
| Triphenyl phosphite | 0.5 |
| Xylene | 52.3 |

The above ingredients were charged to a reaction vessel equipped with a stirrer, a nitrogen inlet tube, a thermometer, a steam jacket column, a fractionating column and a distillation head connected to a condenser and a receiver. The resultant mixture was heated to about 210° C. reflux under nitrogen. At such temperature, there resulted the production of water (esterification). Water was continuously removed as heating was continued. The reaction mixture was held at 210° C. for about 12 hours until an acid value of between about 7 and 9 was reached. The resultant product was then cooled, discharged and analyzed. Analysis of the product indicated a solids content of 78 percent, a viscosity of about Z5-, an acid value of about 9, and a hydroxyl value of about 270.

EXAMPLE 1

A pigmented coating composition was prepared from the following:

| Ingredients | Parts by Weight |
| --- | --- |
| Pre-blend | |
| Acrylic polyol of Example A | 82.39 |
| Polyester polyol of Example B | 55.03 |
| Thixotropic clay[1] | 5.79 |
| Anti-settling additive[2] | 5.79 |
| Wetting agent[3] | 4.10 |
| Pigment Blend | |
| Chromium oxide | 31.47 |
| Camouflage green[4] | 185.36 |
| Mapico tan[5] | 54.23 |
| SOLVESSO 100 | 31.86 |
| Let Down Mix | |
| Blocked isocyanate[6] | 157.19 |
| Melamine resin[7] | 40.35 |
| SOLVESSO 150 | 84.89 |
| Sulfonic acid catalyst[8] | 2.30 |
| Dibutyl tin dilaurate | 1.90 |
| Post Grind Solvent | |
| SOLVESSO 100 | 10.59 |
| SOLVESSO 150 | 42.44 |
| Silane-treated silica[9] | 382.69 |
| Silica | 137.32 |
| Methyl isobutyl ketone | 21.27 |
| Post Addition | |
| Hostaperm violet paste[10] | 4.30 |

| -continued | |
|---|---|
| Ingredients | Parts by Weight |
| Methyl isobutyl ketone | 21.27 |

[1] An organic derivative of a special smectite clay, available as BENTONE ® SD1 from NL Industries.
[2] An organic high solids paste, 60 percent by weight in xylene, available as MPA ® 60X from NL Industries.
[3] Available as ANTI-TERRA U ® from Byc-Mallinkrodt Inc.
[4] Available from Ferro Co.
[5] Available from Columbian Co.
[6] Methyl ethyl ketoxime-blocked isocyanurate of hexamethylene diisocyanate, available as DESMODUR ® BL-3175 from Mobay Chemical Co.
[7] Partially methylated melamine available as CYMEL ® 325 from American Cyanamid Co.
[8] A dinonylnaphthalene monosulfonic acid in 2-butoxyethanol, available as NA-CURE 1051 from King Industries.
[9] Silica treated with hexamethyldisilazane, available as NOVAKUP DAPER from Malvern Minerals Company.
[10] The Hostaperm violet paste contained 6.43 weight percent Hostaperm violet pigment available from Hoechst Celanese in 52.31% of a binder component and 41.26% of a solvent component. The binder component comprised 49.74% (based on weight of binder solids) of the acrylic polyol of Example A, 49.66% of the polyester polyol of Example B, 0.26% of the ANTI-TERRA U wetting agent, 0.27% of BENTONE SD1 thixotropic clay and 0.07% by weight of the MPA 60X anti-settling additive. The solvent component comprised 41.43% (based on solvent weight) of SOLVESSO 100, 17.73% by weight methyl isobutyl ketone, 7.25% by weight of xylene and 33.26% of SOLVESSO 150.

The acrylic polyol, polyester polyol, thixotropic clay, wetting agent and anti-settling additive were mixed. Then, the pigment blend was added to the admixture and dispersed, i.e., ground, to a Hegman grind 6.0 to provide a pigment paste. The post grind solvents were added as a wash. A letdown mixture was prepared by mixing in sequentially with agitation the following: the blocked isocyanate; the melamine resin; SOLVESSO 150; dibutyl tin dilaurate; sulfonic acid catalyst; silane-treated silica; and silica. After the letdown mixture was thoroughly mixed for a half hour, the methyl isobutyl ketone was added. The pigment paste was then added to the letdown mixture with agitation. Finally, the violet pigment and additional MIBK were added with mixing.

The resulting coating composition was applied onto substrates at film thicknesses in accordance with the herein described military specification and tested for acid resistance, DS2 resistance, chemical agent resistance, recoatability, hardness, flexibility, gloss and spectral reflectance as described in the miltary specification. All properties of the coating passed the requirements of said specification.

Examples of testing procedures were as follows:

Acid Resistance

A three to five milliliter (ml) spot of a 10 percent by volume acetic acid solution is placed onto the surface of a coated panel, covered with a watchglass and allowed to stand for one hour. The panel is then rinsed with water, dried and examined for blistering or color change.

DS2 Resistance

A half milliliter sample of DS2 agent is placed onto the surface of a coated panel and allowed to stand for 30 minutes. The panel is then rinsed with water and examined for blistering, wrinkling, softening or color change.

Mandrel Bend Test

The coating is tested for flexibility by bending the coated panel around a ⅛-inch rod and examining for cracking or delamination.

Pencil Hardness

Pencil hardness is determined by taking pencils of increasing hardness (from F to 6H) and attempting to etch a scribe mark in the coating. The softest pencil which will etch the coating is reported as the pencil hardness for the film.

Gloss

Gloss measurements are carried out with a Gardner Gloss Mete available from the Gardner Instrument Company. Gloss measurements at a 60° and 85° incident angle to the coating are preferably less than 1.0 and 3.5 respectively.

Therefore, what is claimed is:

1. A thermosetting coating composition comprising:
   (a) an acrylic polyol;
   (b) a polyester polyol;
   (c) a blend of curing agents; and
   (d) a liquid carrier.

2. The composition of claim 1 wherein the blend of curing agents includes an aminoplast resin and a blocked polyisocyanate.

3. The composition of claim 1 further comprising pigments adapted to provide low gloss and a camouflaged spectral reflectance.

4. The composition of claim 1 wherein the acrylic polyol is characterized as a stepwise reaction product of: (i) a hydroxy-containing acrylic copolymer; (ii) a dicarboxylic acid anhydride; and (iii) a monoepoxide functional monomer.

5. The composition of claim 1 wherein the acrylic polyol is characterized as a stepwise reaction product of: (i) a hydroxy-containing acrylic copolymer prepared from a mixture including (a) about 5 to about 35 percent by weight of a monoethylenically unsaturated hydroxy-containing monomer and (b) from about 65 to about 95 percent by weight of other monoethylenically unsaturated monomers; (ii) a dicarboxylic acid anhydride; and (iii) a monoepoxide functional monomer.

6. The composition of claim 1 wherein the acrylic polyol is characterized as a stepwise reaction product of: (i) a hydroxy-containing acrylic copolymer prepared from (a) about 5 to about 35 percent by weight of a hydroxyalkyl acrylate or methacrylate having from about 2 to about 6 carbon atoms in the alkyl group, (b) from about 1 to about 10 percent by weight of acrylic acid or methacrylic acid; and (c) from about 65 to about 95 percent by weight of a vinyl aromatic compound; (ii) tetrahydrophthalic anhydride; and (iii) a glycidyl ester of tertiary mono-carboxylic acid blend having carbon chain lengths of from 9 to 11 carbon atoms.

7. The composition of claim 1 wherein the polyester polyol is characterized as a reaction product of neopentyl glycol and hexahydrophthalic anhydride.

8. The composition of claim 4 wherein the polyester polyol is characterized as a reaction product of neopentyl glycol and hexahydrophthalic anhydride.

9. The composition of claim 5 wherein the polyester polyol is characterized as a reaction product of neopentyl glycol and hexahydrophthalic anhydride.

10. The composition of claim 6 wherein the polyester polyol is characterized as a reaction product of neopentyl glycol and hexahydrophthalic anhydride.

11. The composition of claim 1 wherein the acrylic polyol is characterized as a stepwise reaction product of: (i) a hydroxy-containing acrylic copolymer, (ii) a dicarboxylic acid anhydride, and (iii) a monoepoxide functional monomer; the polyester polyol is characterized as a reaction product of neopentyl glycol and hexahydrophthalic anhydride; the blend of curing agents includes an aminoplast resin characterized as a partially alkylated melamine-formaldehyde resin modified by methanol and a blocked polyisocyanate characterized as a methyl ethyl ketoxime blocked isocyanurate of hexamethylene diisocyanate.

12. The composition of claim 11 further comprising pigments adapted to provide a camouflaged spectral reflectance.

13. The composition of claim 12 wherein the pigments include a silane-treated silica adapted to reduce gloss of the resultant coating.

14. A coating composition comprising:
   (a) an acrylic polyol characterized as a stepwise product of: (i) a hydroxy-containing acrylic copolymer prepared from (1a) about 5 to about 35 percent by weight of a hydroxyalkyl acrylate or methacrylate having from about 2 to about 6 carbon atoms in the alkyl group, (1b) from about 1 to about 10 percent by weight of acrylic or methacrylic acid, and (1c) from about 65 to about 95 percent by weight of a vinyl aromatic compound; (ii) tetrahydrophthalic anhydride; and (iii) a glycidyl ester of tertiary mono-carboxylic acid blend having carbon chain lengths of from 9 to 11 carbon atoms;
   (b) a polyester polyol characterized as a reaction product of neopentyl glycol and hexahydrophthalic anhydride;
   (c) a blend of curing agents including a melamine resin characterized as a partially alkylated melamine-formaldehyde resin modified by methanol and a blocked diisocyanurate characterized as a methyl ethyl ketoxime blocked isocyanurate of hexamethylene diisocyanate;
   (d) pigments adapted for providing low gloss and camouflaged IR reflectance; and
   (e) a liquid carrier.

* * * * *